US005657899A

United States Patent [19]

Stoken

[11] Patent Number: 5,657,899

[45] Date of Patent: Aug. 19, 1997

[54] SYSTEM FOR AND METHOD OF DISPENSING LOTTERY TICKETS

[75] Inventor: Raymond G. Stoken, Irwin, Pa.

[73] Assignee: Cory Consultants, Inc., Tucson, Ariz.

[21] Appl. No.: 527,946

[22] Filed: Sep. 14, 1995

[51] Int. Cl.$^{6}$ .......... B65G 59/00

[52] U.S. Cl. .......... 221/1; 364/412

[58] Field of Search .......... 221/2, 7, 9, 13–25, 221/124, 129; 273/138.1, 138.2; 364/412, 410, 479

[56] References Cited

U.S. PATENT DOCUMENTS

| | | | |
|---|---|---|---|
| 4,677,553 | 6/1987 | Roberts et al. | 364/412 |
| 4,689,742 | 8/1987 | Troy et al. | 364/412 |
| 4,725,079 | 2/1988 | Koza et al. | 283/73 |
| 4,740,016 | 4/1988 | Konecny et al. | 283/903 |
| 4,842,278 | 6/1989 | Markowicz | 273/138 A |
| 5,007,641 | 4/1991 | Seidman | 273/138 A |
| 5,039,848 | 8/1991 | Stoken | 235/381 |
| 5,222,624 | 6/1993 | Barr | 221/13 |
| 5,272,321 | 12/1993 | Otsuka et al. | 221/2 |
| 5,290,033 | 3/1994 | Bittner et al. | 273/138 A |
| 5,335,822 | 8/1994 | Kasper | 221/259 |
| 5,348,299 | 9/1994 | Clapper | 273/138 A |
| 5,377,975 | 1/1995 | Clapper | 273/138 A |

*Primary Examiner*—Kenneth Noland

*Attorney, Agent, or Firm*—James L. Sherman

[57] ABSTRACT

A lottery ticket dispensing system is for pull-tab lottery tickets of the type that include a plurality of normally closed windows that can be opened to reveal play symbols thereunder with some of the play symbols being winning symbols. Each of the lottery tickets is provided bar code markings including ticket information for indicating each of the play symbols as aligned with its respective window. A lottery ticket dispensing machine includes a ticket storage area and means for initiating the dispensing of the ticket from the storage area to the front panel of the machine. When the ticket is being dispensed, it is aligned with a bar code reading device that is operably connected to electronic control circuitry of the machine that receives and stores the ticket information included in the bar code markings of the dispensed ticket. The front panel of the machine includes a plurality of display areas and associated switches that correspond to the windows of the ticket. Selective activation of each switch causes the electronic control circuitry to generate a display symbol in the corresponding display area which indicates the play symbol that is under the selected window of the ticket. The ticket information also includes winning information and the electronic control circuitry will receive and store the winning information in order to generate a winning indication in a separate winning display area on the front panel when any of the play symbols are winning symbols.

21 Claims, 3 Drawing Sheets

SYSTEM FOR AND METHOD OF DISPENSING LOTTERY TICKETS

BACKGROUND OF THE INVENTION

1. Field of the Invention

This invention relates to a system for dispensing of lottery tickets and to the method of doing the same, and more specifically, to such a system which allows a player to obtain and electronically "play" a lottery ticket of the type which has a plurality of normally closed window areas for hiding play symbols printed on an inside portion thereof. Such tickets can normally be determined to include a winning array of such symbols only upon the opening of the windows to reveal the play symbols thereunder. A dispensing machine of the system includes a plurality of display areas which directly correspond to the window areas of a ticket which has been dispensed and enables a player to selectively electronically "play" each window area to cause the play symbols thereunder to be seen in the respective display area of the machine without physically opening the normally closed windows of the lottery ticket.

2. Brief Description of the Prior Art

It is known to make "pull-tab" lottery tickets of the type which contain a plurality of windows such as those disclosed in U.S. Pat. No. 4,740,016. As taught therein, one way of manufacturing such tickets is to use of two sheets of paper which are joined together by a specific form of pattern gluing. A plurality of play symbols is printed on a rear sheet while the front sheet has a plurality of perforated die closures which define a plurality of windows. The windows are positioned so that when the front and rear sheets are glued together and when the windows are opened along the perforated edges, the play symbols are revealed. The glue is applied to the sheets in a pattern so that when the tickets are assembled, the windows are not bonded to the rear sheet.

However, as expressed in U.S. Pat. No. 4,740,016, one problem that could exist with such tickets is that a losing ticket could be relatively easily and fraudulently changed into a winning ticket. Prior to the design disclosed therein, the winning symbols could be removed from a previously honored winning ticket and inserted into a losing ticket. The paper which contained the winning symbols could be removed from the winning ticket by making cuts along the four edges of the window down to the middle level of the paper. Similarly, a losing set of symbols would be removed from the losing ticket. Once the winning symbols have been placed in the losing ticket, it is difficult to detect the alteration.

U.S. Pat. No. 4,740,016 discloses a means for altering the original design of the tickets to help eliminate such fraudulent reconstruction of the tickets. The improved tickets still include the front sheet, the rear sheet, means for bonding the front sheet and the rear sheet together, and a plurality of plurality of symbols on the rear sheet facing the front sheet, which could include a set of winning symbols. However, they further include security indicia on the side of the rear sheet corresponding to the set of winning symbols. Specifically, the security indicia includes a pattern on a portion of the rear sheet that contains the winning symbols which pattern extends beyond the winning window and is partially covered by the front sheet. Another embodiment disclosed therein includes an additional or alternative security indicia in the form of a winning prize code which can also be printed on the rear sheet in a location not related to the winning symbols and not aligned with the windows. In either case, the sheets of the "winning" ticket could be separated to confirm that it is truly a winning ticket.

U.S. Pat. No. 5,290,033 discloses a gaming machine and game coupons that could be in a form that is similar to the "pull-tab" lottery tickets discussed above. In some prior art machines, the player purchases game coupons from a pull-tab machine by inserting cash or game tokens. Such game coupons themselves are commonly packaged in game coupon sets. Each game coupon set comprises a known total of individual game coupons and a known number of winning game coupons within the total. Individual game coupons usually formed of two sheets: a facing sheet and a backing sheet. Serrated windows or tabs are formed in the facing sheet of the coupon. The backing sheet is imprinted with game symbols or other representations beneath the tabs. To determine whether or not an individual game coupon was a winning coupon, a player peeled back the tab to reveal the game symbols. Winning game coupons could be redeemed for cash winnings, game tokens or other prizes with a cashier.

According to U.S. Pat. No. 5,290,033, an important disadvantage of such gaming machines was the significant time and effort being consumed, by both the player and the proprietor of the gaming establishment, in redeeming the winning coupons for cash. During the time it took to cash in a winning coupon, a player could lose interest in the game. Accordingly, the improved gaming machine and game coupons included means for the player to continue playing a game without interruption by the utilization of the winning game coupons at the machine itself to purchase additional game credits. The improved means taught therein includes providing a bar code on the back surface of a single, removed playing portion of a "preferred" game coupon which includes only the single playing portion or window. The single playing portion is said to be advantageous because it can be provided such a bar code and is in a single sheet form that can easily be inserted into a game coupon reader, as part of a bill validator, for verification and for issuing game credits. The pull-tab lottery tickets discussed above, which include a plurality of windows or tabs, are not considered preferred in U.S. Pat. No. 5,290,033 because of the difficulty of providing any coupon verification device that could accept lottery coupons or tickets that have a plurality of opened windows or tabs extending from the surface thereof. In any case, the bar code of these improved game coupons are said to include ten decimal digits which can be decoded by a standard bar code reader. The information in the bar code appears to be generally limited to the game set or lot number which is identical for all of the game coupons of the set, to a unique coupon identification code that can be recorded to insure that the same coupon is not verified twice and to a prize code indicating the number of prize credits associated with the winning game coupon.

U.S. Pat. No. 5,377,975 discloses a different electronic gaming apparatus that includes yet another form of pull-tab coupon configuration. Rather than individual tickets, the game apparatus includes a primary strip of a suitable substrate in the form of a roll. Indicia is printed in individual strip segments. Upon actuation of the apparatus, a segment of the strip is severed to provide a strip segment or game card and is dispensed. If the indicia on the severed segment corresponds to a winning indicia, the player would win the game and the game card or ticket could be redeemed for winnings. The preferred configuration includes a duplicate copy of each severed segment of the primary strip, containing the same indicia as the primary strip segment, which is maintained on a duplicate strip and stored for purposes of later auditing. This second strip is in roll form that is to be stored within the apparatus.

Although this overall configuration, including a primary strip in roll form and a secondary strip in roll form for retention within the apparatus, may experience limited acceptance in the gaming art, U.S. Pat. No. 5,377,975 does disclose addition features which are of interest. The secondary strip of indicia also contains a bar code printed on the back thereof corresponding to the indicia printed on each strip segment that is to be dispensed. The apparatus includes an electronic display and means for reading and storing the information of the bar code so that, as the segment of the strip is dispensed from the apparatus, the results of the play of the dispensed segment is simultaneously displayed on the screen. It should be noted that the segments of the strip are similar to the preferred game coupons of U.S. Pat. No. 5,290,033 having only one window or tab. They appear to include only one play area which is revealed after the segment is separated from the primary strip and dispensed from the apparatus. Accordingly, when the segment of the strip is dispensed, the indicia of the of the entire play area is displayed on the screen.

U.S. Pat. Nos. 5,290,033 and 5,377,975 include interesting pull-tab lottery ticket dispensing machines that employ game coupons or strip segments that include bar code information for the purposes disclosed therein. However, both of these configurations are missing one of the primary features of the type of pull-tab lottery ticket disclosed in U.S. Pat. No. 4,740,016. Many popular pull-tab lottery tickets include the multi-window configuration having a plurality of play areas that enhance the playing enjoyment of the player. With such a pull-tab lottery ticket, the player has several chances to win within the same lottery ticket and, by allowing the separate and selective opening of the plurality of windows or tabs, there is heighten suspense during the play as each window or tab is opened. Such pull-tab lottery tickets having a plurality of windows or tabs are very popular and have experienced wide acceptance among players because each ticket appears to provide multiple opportunities to win.

U.S. Pat. Nos. 4,677,553 and 4,725,079 disclose instant lottery tickets that include different forms of numerical or bar codes on the surfaces thereof to assist in the verification and validation of winning tickets but are not directed to nor configured for the preferred pull-tab lottery tickets having a plurality of windows as discussed above.

OBJECTS OF THE INVENTION

It is an object of the invention to provide a lottery ticket dispensing system for lottery tickets which include a plurality of windows or tabs having a plurality of play symbols thereunder, some of which may be winning symbols, wherein the system employs a machine for the selective displaying of the play symbols in each window after a lottery ticket is dispensed from the machine.

It is another object of the invention to provide such a lottery ticket dispensing system which includes a winning display on the machine which is indicative of winning symbols which may exist in any lottery ticket which has been dispensed from the machine.

It is a further object of the invention to provide such a lottery ticket dispensing system which includes game information on the front panel of the machine regarding all of the possible winning symbols for the lottery tickets in the ticket storage area and the winning display is positioned relative to the game information on the front panel.

These and other objects of the invention are provided in a preferred embodiment thereof including a lottery ticket dispensing system for lottery tickets of the type which include a front sheet having a plurality of windows which are normally closed, a rear sheet, means for bonding the front sheet and the rear sheet together, a plurality of play symbols on one side of the rear sheet toward the front sheet, at least some of the play symbols capable of being winning symbols, each of the play symbols being respectively aligned with one of the windows, and each of the plurality of windows for being selectively opened to reveal the play symbol thereunder. The lottery ticket dispensing system includes bar code markings on each of the lottery tickets including ticket information for indicating each of the play symbols as aligned with its respective window. A lottery ticket dispensing machine includes a housing and a front panel. A ticket storage area in the housing for storing an plurality of the lottery tickets. A ticket dispensing initiation element is in the housing. Electronic control circuitry in the housing is for responding to activation of the ticket dispensing initiation element and for dispensing a lottery ticket from the ticket storage area to the front panel. A bar code reading device in said housing is operably connected to the electronic control circuitry for reading and identifying the bar code markings of each lottery ticket and for storing the ticket information in the electronic control circuitry regarding each of the play symbols as aligned with its respective window as the lottery ticket is being dispensed from the ticket storage area. The front panel includes a plurality of display areas which directly correspond to the plurality of windows of the lottery ticket. Each of the display areas is operably connected to said electronic control circuitry for receiving display signals therefrom. The front panel has a switch associated with each of the display areas. Each of the switches is operably connected to the electronic control circuitry. The switches are for being selectively actuated to provide an actuation signal to the electronic control circuitry to cause it to generate the display signal for the display area associated with the switch. The display signal produces a display symbol in the display area. For each lottery ticket having been dispensed from the ticket storage area, the display symbol in each display area directly indicates the play symbol aligned with the window which corresponds to the display area associated with each switch which has been selectively actuated.

The preferred lottery ticket dispensing system includes the ticket dispensing initiation element having a currency receiving component in the housing for receiving currency of a predetermined amount and the electronic control circuitry is for determining when the amount is received within the currency receiving component and for dispensing the lottery ticket. The bar code markings include winning information for indicating when the play symbols are winning symbols. The front panel includes a winning display area. The electronic control circuitry identifies and stores the winning information and generates a winning signal when the winning information is in the ticket information. The winning display area is operably connected to the electronic control circuitry for receiving the winning signal therefrom and the winning signal produces a winning indication in the winning display area after the switch associated with the window having the play symbols which are winning symbols is actuated. The winning signal can produce the winning indication in the winning display area after all of the switches associated with the windows have been actuated. Still further, the front panel includes game information indicating a plurality of possible winning symbols associated with the lottery tickets in the ticket storage area and the winning indication in the winning display area is displayed relative to a corresponding winning symbol in the game information on the front panel. Additionally, the front panel can include a combined switch element which is operably connected to said electronic control circuitry. The combined switch element is capable of being actuated to generate the display signals for all of the display areas of each lottery ticket having been dispensed from the ticket storage area to produce the display symbols in all of the display areas and to produce any winning indication in the winning display area.

The lottery ticket dispensing system can include the ticket storage area having a discharge chute for passage of the lottery ticket from an interior of the housing to an exterior of the housing at the front panel. The discharge chute can include a ticket retarder for retarding the passage of the lottery ticket to the exterior of the housing. The bar code reading device is aligned with the discharge chute and any lottery ticket therein which is being retarded by the ticket retarder. The bar code reading device is capable of reading the bar code markings when the lottery ticket is maintained in a fixed position in the discharge chute by the ticket retarder. The ticket retarder includes a normally closed gate which is electronically controlled by the electronic control circuitry. The electronic control circuitry is capable of repeatedly activating the bar code reading device until the bar code reading device has properly identified the bar code markings. The electronic control circuitry causes the normally closed gate to be opened to release the lottery ticket for continued passage to the exterior of the housing at the front panel after the ticket information is stored within the electronic control circuitry. The ticket storage area can includes a plurality of ticket storage racks with each of the plurality of ticket storage racks being aligned with the discharge chute for selectively discharging the lottery tickets therein to the discharge chute.

Another preferred embodiment of the invention includes a lottery ticket dispensing system for lottery tickets of the type which include a front sheet having window features which are normally closed, a rear sheet, means for bonding the front sheet and the rear sheet together, a plurality of play symbols on one side of the rear sheet toward the front sheet, at least some of the play symbols capable of being winning symbols, the play symbols being respectively located in various regions of the one side aligned with the window features, and the window features for being selectively opened to reveal the play symbols in the various regions thereunder. The lottery ticket dispensing system includes bar code markings on each lottery ticket including ticket information for indicating each of the play symbols in the various regions. A lottery ticket dispensing machine includes a housing and a front panel. A ticket storage area is in the housing for storing an plurality of the lottery tickets. A ticket dispensing initiation element is in the housing. Electronic control circuitry in the housing is for responding to activation of the ticket dispensing initiation element and for dispensing a lottery ticket from the ticket storage area to the front panel. A bar code reading device in the housing is operably connected to the electronic control circuitry for reading and identifying the bar code markings of each lottery ticket and for storing the ticket information in the electronic control circuitry regarding each of the play symbols as located in the various regions as the ticket is being dispensed from the ticket storage area. The front panel has a plurality of display areas which directly correspond to the various regions of the lottery ticket. Each of the display areas is operably connected to the electronic control circuitry for receiving display signals therefrom. The front panel has a switch associated with each of the display areas. Each of the switches is operably connected to the electronic control circuitry. The switches are each for being selectively actuated to provide an actuation signal to the electronic control circuitry to cause it to generate a display signal for the display area associated with the switch. The display signal produces a display symbol in the display area. For each lottery ticket having been dispensed from the ticket storage area, the display symbol in each display area is directly indicative of the play symbols of each of the various regions which corresponds to the display area associated with each switch which has been selectively actuated.

The preferred embodiment can also include the bar code markings including winning information for indicating when the play symbols are winning symbols. The front panel includes a winning display area. The electronic control circuitry identifies and stores the winning information and generates a winning signal when the winning information is in the ticket information. The winning display area is operably connected to the electronic control circuitry for receiving the winning signal therefrom. The winning signal produces a winning indication in the winning display area after the switch associated with one of the various regions having the play symbols which are winning symbols is actuated. The front panel can include game information indicating a plurality of possible winning symbols associated with the lottery tickets in the ticket storage area and the winning indication in the winning display area can be displayed relative to a corresponding winning symbol in the game information on the front panel. Still further, the front panel can include a combined switch element. The combined switch element is operably connected to the electronic control circuitry. The combined switch element is capable of being actuated to generate the display signals for all of the display areas of each lottery ticket having been dispensed from the ticket storage area to produce the display symbols in all of the display areas and to produce any winning indication in the winning display area.

Yet another embodiment of the invention includes a lottery ticket dispensing machine for dispensing lottery tickets of the type which include a base sheet having a plurality of play symbols respectively disposed within a plurality of regions on one side of the base sheet, at least some of the play symbols capable of being winning symbols, and bar code markings on each lottery ticket including ticket information for indicating each of the play symbols as arranged in the plurality of regions on the one side of the base sheet. The lottery ticket dispensing machine includes a ticket storage area for storing an plurality of the lottery tickets. A ticket dispensing initiation element is in the housing. Electronic control circuitry in the housing is for responding to activation of the ticket dispensing initiation element and for dispensing a lottery ticket from the ticket storage area to the front panel. A bar code reading device is operably connected to the electronic control circuitry for reading and identifying the bar code markings of each lottery ticket and for storing the ticket information in the electronic control circuitry regarding each of the play symbols as arranged in the plurality of regions on the one side of the base sheet as the lottery ticket is being dispensed from the ticket storage area. A front panel has a plurality of display areas which directly correspond to the plurality of regions having the play symbols. Each of the display areas is operably connected to the electronic control circuitry for receiving display signals therefrom. The front panel has a switch associated with each of the display areas. Each of the switches is operably connected to the electronic control circuitry. The switches are for being selectively actuated to provide an actuation signal to the electronic control circuitry to cause it to generate the display signal for the display area associated with the switch. The display signal produces a display symbol in the display area. For each lottery ticket having been dispensed from said ticket storage means, the display symbol in each display area is directly indicative of the play symbols of each region which corresponds to the display area associated with each switch which has been selectively actuated.

With other possible features included in the preferred embodiment of the invention, the electronic control circuitry is capable of analyzing the ticket information and of determining if the play symbols in a particular region are winning symbols. The front panel includes a winning display area. The electronic control circuitry generates a winning signal when the particular region has the winning symbols. The winning display area is operably connected to the electronic control circuitry for receiving the winning signal therefrom. The winning signal produces a winning indication in the winning display area after the switch associated with the display area corresponding with the particular region is actuated. The front panel can include game information indicating a plurality of possible winning symbols associated with the lottery tickets in the ticket storage area and the winning indication in the winning display area is displayed relative to a corresponding winning symbol in the game information on the front panel.

Other objects of the invention can be found in another embodiment which includes a method of dispensing lottery tickets of the type which include a base sheet having a plurality of play symbols respectively disposed within a plurality of regions on one side of the base sheet. At least some of the play symbols are capable of being winning symbols. The method includes the steps of: providing bar code markings on each lottery ticket which include ticket information for indicating each of the play symbols as arranged in the plurality of regions on the one side of the base sheet; providing a machine having a housing and a front panel; storing a plurality of the lottery tickets in the housing; providing a ticket dispensing initiation element in the housing; determining when the ticket dispensing initiation element is actuated and dispensing a lottery ticket from the housing to the front panel; reading the bar code markings to identify the ticket information and storing the ticket information regarding each of the play symbols as arranged in the plurality of regions on the one side of the base sheet as the lottery ticket is dispensed from the housing; providing a plurality of display areas on the front panel which directly correspond to the plurality of regions having play symbols; providing a switch on the front panel for each of the display areas; and separately actuating each of the switches respectively associated with each of the regions and displaying a display symbol in the display area which is directly indicative of the play symbol of each of the regions on the one side of the base sheet of the lottery ticket that has been dispensed from the housing.

The method of dispensing lottery tickets can include providing the bar code markings on each lottery ticket to further include winning information for indicating when the play symbols are winning symbols, reading the bar code markings to identify and store the winning information as the lottery ticket is dispensed from the housing and further including the steps of providing a winning display area on the front panel and displaying a winning indication in the winning display area after the actuating of the switch associated with the region having play symbols which are winning symbols. The method of dispensing lottery tickets could include the step of dispensing the lottery ticket which includes discharging the lottery ticket from an interior of the housing to an exterior of the housing at the front panel and additional steps which would include retarding the passage of the lottery ticket in the discharge chute during the reading of the bar code markings and releasing the lottery ticket for continued passage to the front panel after the storing of the ticket information. An alternative method of dispensing lottery tickets can include the step of providing a currency receiving component in the housing for receiving currency of a predetermined amount and for activating the ticket dispensing initiation element when the currency of the predetermined amount has been received therein.

DETAIL DESCRIPTION OF THE PREFERRED EMBODIMENTS

Figure 1:
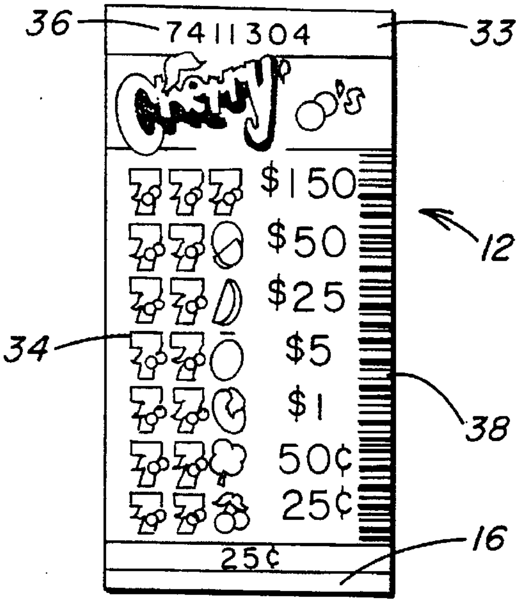
FIG. 1 is a back view of a lottery ticket which includes various features of the invention and which can be employed in a preferred embodiment of the invention.
Figure 2:
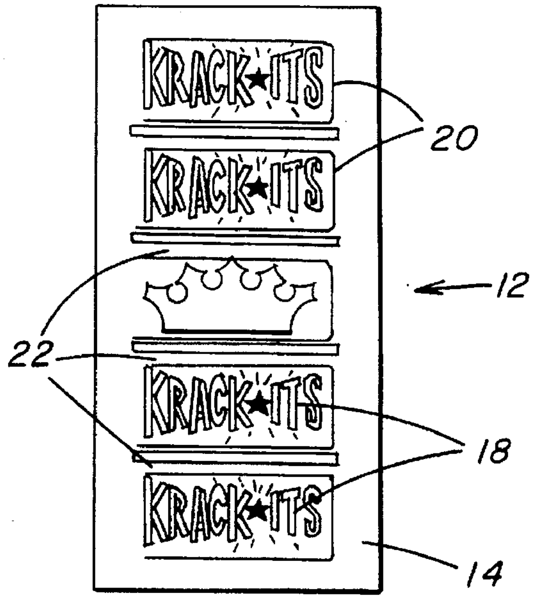
FIG. 2 is a front view of the lottery ticket of FIG. 1.
Figure 3:
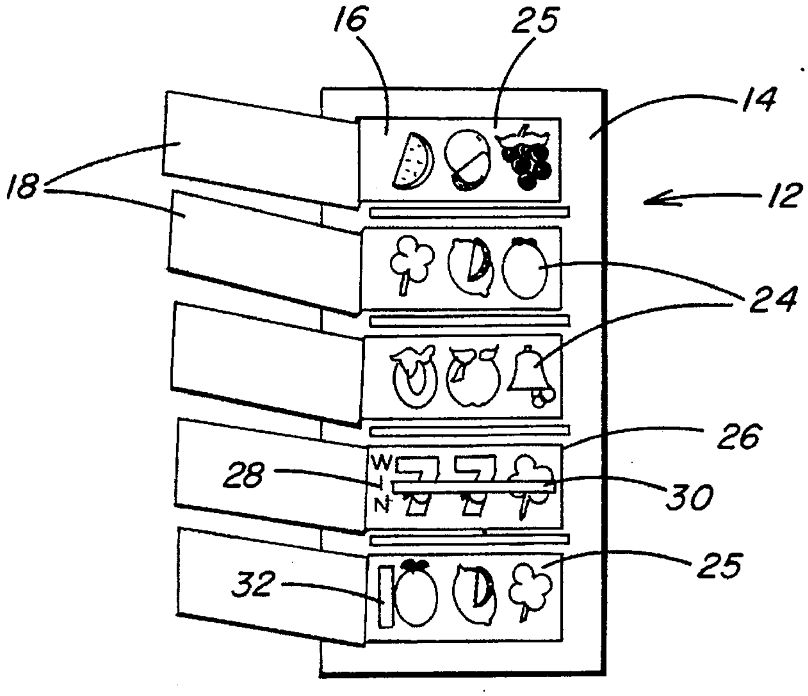
FIG. 3 is another front view of the lottery ticket of FIG. 2 with the windows open to reveal the play symbols thereunder.

As seen in FIGS. 1, 2 and 3, a preferred lottery ticket dispensing system of the invention includes lottery tickets 12 of the type which are similar to the pull-tab lottery tickets disclosed in U.S. Pat. No. 4,740,016. Such a lottery ticket 12 includes a front sheet 14 and a rear sheet 16 which are generally joined together to provide a unitary structure for the ticket 12. The front sheet 14 includes a plurality of "closed" windows or tabs 18 which are formed by the perforations 20 of the front sheet material along three edges of the window 18 (as seen in FIG. 2) and can be opened by tearing along the perforations 20 and bending the front sheet material back along the fourth edge of the window 18 (as seen in FIG. 3). The front sheet 14 and the rear sheet 16 are bonded along the edges of the ticket 12 and in the regions 22 between the windows 18.

The preferred lottery ticket 12 includes the plurality of windows 18 which are to be selectively opened by the player to reveal a plurality of play symbols 24 printed on the inside surface 25 of the rear sheet 16 in alignment with each of the windows 18. The objective of the game is find various play symbols 24 which are particularly configured to be classified as winning symbols 26. The particular lottery ticket 12 shown in FIG. 2 includes a play symbol 24 in the first or upper window 18 which includes a combination of a "watermelon", an "orange", and "grapes" that is not winnings symbol 26. However, the fourth window 18 includes a play symbol 24 of two "sevens" and a "clover" that is a winning symbol 26. Consequently, the player of the particular lottery ticket 12 shown in FIGS. 1, 2 and 3 would find that a winning symbol 26 in the fourth window 18 exists and that there is further indication of a win by the printing of "win" 28 and an additional "line" 30 across the winning symbol 26. Still further, to provide another level of security, of a type generally disclosed and discussed in U.S. Pat. No. 4,740,016, the fifth or bottom window 18 includes an additional winning indication in the form of the printed "monetary amount" 32.

As seen in FIG. 1, the back 33 of the rear sheet 16 preferably includes a significant amount of information that is both helpful to the player and useful for the practice of some of the embodiments of the invention. Specifically, the back 33 includes game information 34 in the form of a series or list of symbols which comprise all of the possible winning symbols 26 for the particular game of this ticket 12. Such lottery tickets are typically printed in lots of several thousand with the specific number of winning symbols and the corresponding monetary amount for each win being included among the lottery tickets of the lot. The back 33 of the rear sheet 16 also includes a "lot number" 36 for this particular lot which is printed on each and every lottery ticket 12 of the lot to further assure the integrity of the entire lot of such lottery tickets 12.

As thus described, the lottery ticket 12 includes features which are well-known in the prior art. The manufacture of such lottery tickets is fairly complicated in order to be able to include all of the proper play symbols 24, winning symbols 26, "wins" 28, "lines" 30, and "monetary amounts" 32 in the proper locations and in the proper numbers. After the rear sheets 16 are printed and bonded to the front sheets 14, the lottery tickets 12 are systematically shuffled so that no one would be able to determine which lottery tickets 12 include winning symbols 26. The player is able to purchase a lottery ticket 12 and to selectively open the windows 18 to reveal the play symbols 24 thereunder to see if it includes any winning symbols 26. It has been found that the player typically enjoys the ability to separately open all of the windows 18 with the attendant suspense of a possible win each time a window 18 is opened. It gives the player the feeling that theta are several opportunities to win with each lottery ticket 12. In fact, some pull-tab lottery tickets can include more than one set of winning symbols and can even be configured to include winning symbols in vertical or diagonal lines that extend across adjacent windows.

Nevertheless, lottery tickets 12 differ from those of the prior art by the inclusion of preferred bar code markings 38. The bar code markings 38 on each of the lottery tickets 12 includes ticket information for indicating each of the play symbols 24 as aligned with its respective window 18 in the front sheet 14. As will be discussed below, the preferred bar code markings 38 also include winning information to indicate which of the play symbols 24 are winning symbols 26. The purpose of bar code markings 38 on each lottery ticket 12 is to include enough information to allow a preferred lottery ticket dispensing machine 40 of the invention to dispense the particular ticket 12 in a manner which will enable a player to selectively determine the play symbol 24 in each window 18 and to see if any are winning symbols 26. It should be clear that the inclusion of such bar code markings 38 on the tickets 12 further complicates the manufacture of the pull-tab tickets as discussed above. The printing of the bar code markings 38 including the specific ticket information and winning information must be coordinated with the printing of the specific play symbols on the opposite sides of the rear sheet 16 prior to it being joined to the front sheet 14.

Figure 4:
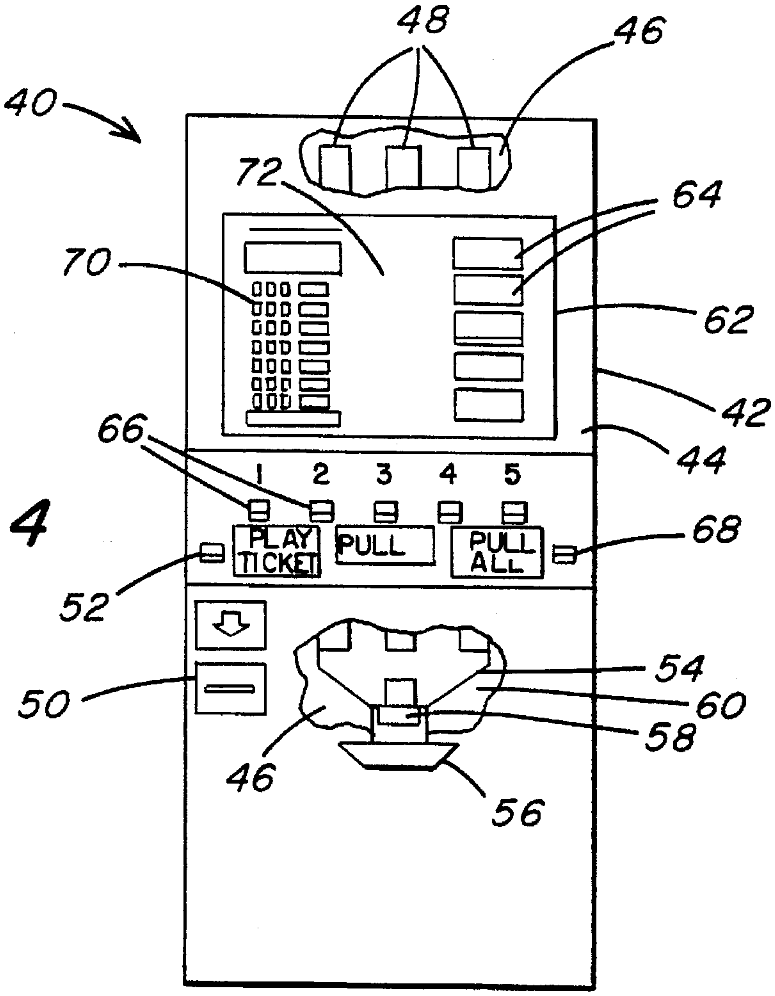
FIG. 4 is an elevational view, including fragmentary portions, of the front of a preferred lottery ticket dispensing machine including various features of the invention.
Figure 5:
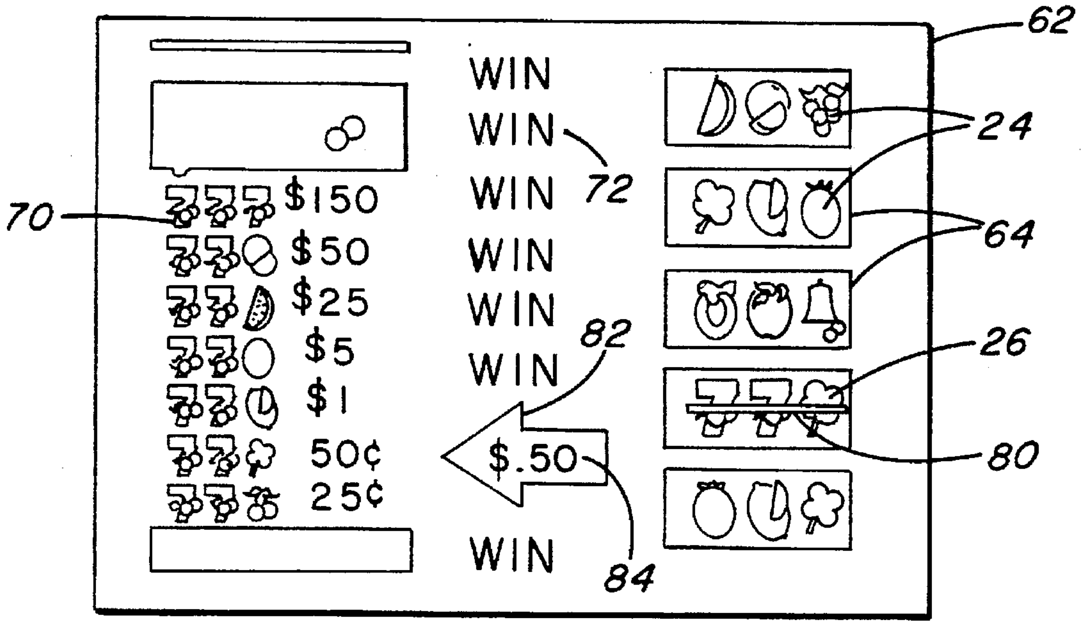
FIG. 5 is an enlarged view of the display screen of the lottery ticket dispensing machine of FIG. 4.
Figure 6:
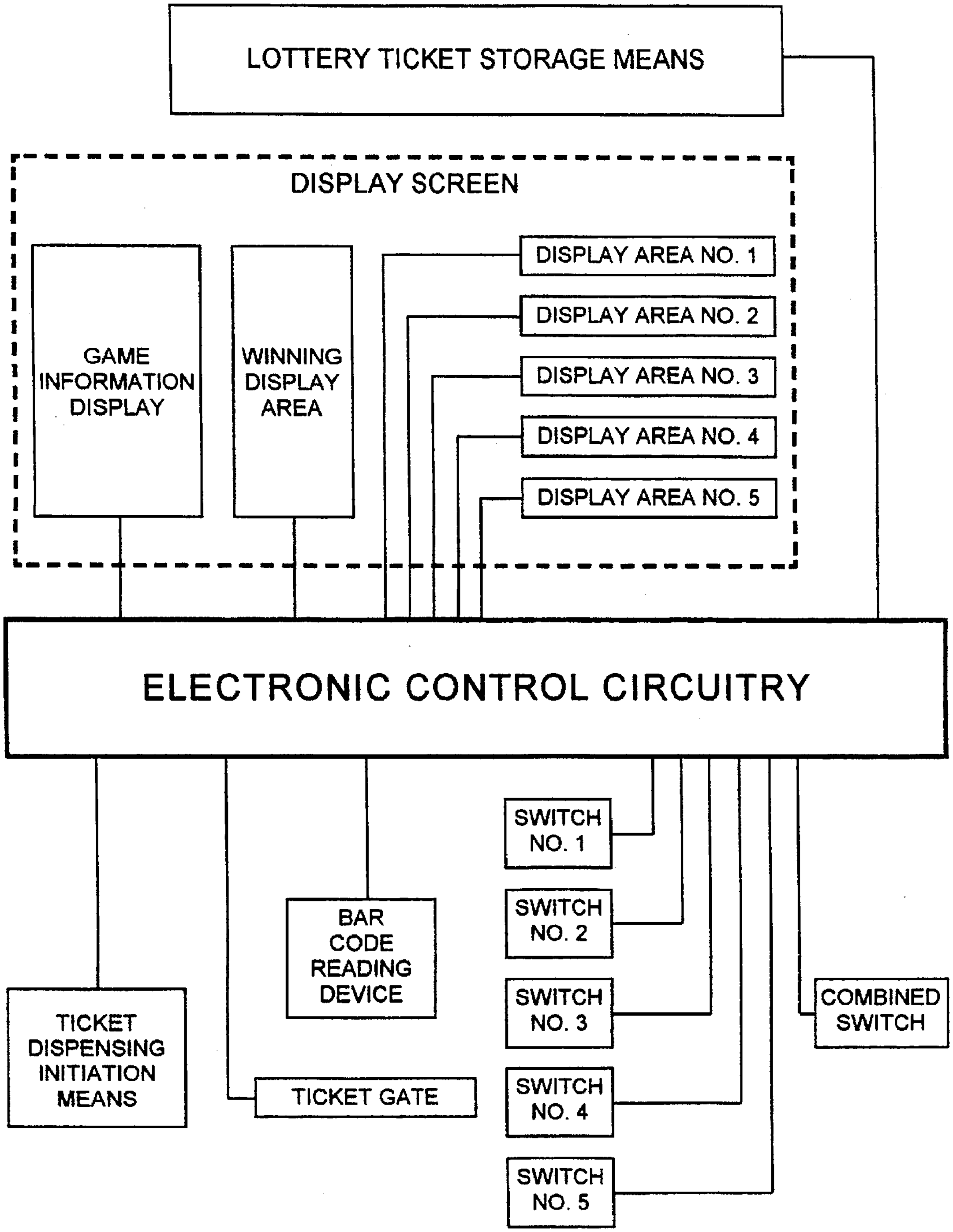
FIG. 6 is a block diagram demonstrating the relationships of the operating components of the lottery ticket machine of FIG. 4 including various features of the invention.

As seen in FIGS. 4, 5 and 6, the preferred lottery ticket dispensing machine 40 includes a housing 42 and a front panel 44. The interior 46 of the housing 42 includes ticket storage means which preferably includes three ticket racks 48 for holding stacks of lottery tickets 12. The housing 42 also includes ticket dispensing initiation means in the form of a currency accepting and verifying device 50 of the type which is well-known in the vending machine art. The preferred currency accepting and verifying device 50 will accept bills but could be of the type that accepts coins or even credit cards to record game credits which will be reduced each time a lottery ticket 12 is dispensed from one of the ticket racks 48. The ticket 12 is dispensed each time a "play" button 52 of the ticket dispensing initiation means is pushed after a proper amount of currency is deposited in the device 50. The device 50 and button 52 are operably connected to electronic control means (FIG. 6) which is preferably in the form of a printed circuit board and associated wiring in the housing 42 which connects various components of the machine 40.

The bottoms of the ticket racks 48 are aligned with a discharge chute 54 which is adapted to direct the passage of each ticket 12 from the ticket storage means in the interior 46 of the machine 40 to a tray 56 on the front panel 44. The chute 54 narrows to direct the ticket 12, independent of which of the racks 48 provides the ticket 12, to ticket retarding means (FIG. 6) which is preferably in the form of a normally closed gate 58. The electronic control means controls the gate 58 to cause is to remain closed to align the ticket 12 in the chute 54 with a bar code reading device 60 of a well-known type which is capable of reading the bar code markings when the ticket 12 is in a stationery position. Such bar code reading devices 60 are capable of reading the bar code markings 38 several times, if necessary, to insure an accurate reading and the electronic control means is configured to not open the gate 58 until the ticket information in the bar code markings 38 is identified and stored in the electronic control means. When the gate 58 is opened, the lottery ticket is deposited in the tray 56 to be retrieved as desired by the player. Of course, the player can physically take the ticket 12 and selectively open each of the windows 18 to determine if there are any winning symbols therein.

However, the front panel 44 of the preferred machine 40 includes an electronic display screen 62 which is capable of displaying the various play symbols 24 on the lottery ticket 12 for the player. The display screen 62 includes a plurality of display areas 64 which correspond to the windows 18 of the lottery ticket 12 which has been dispensed from the machine 40. The front panel 44 also includes a plurality of switches 66 which are directly associated with the display areas 64. Each of the switches 66 and display areas 64 are operably connected to the electronic control means so that an activation signal from one of the switches will cause the electronic control means to generate a display signal for its corresponding display area 64. As seen in FIG. 4, the first and second switches 66 have been activated and the first and second display areas 64 of the display screen 62 have been energized to display the play symbols 24 which are aligned with the first and second windows 18 of the ticket 12.

The player can selectively energize each of the switches 66 in any desired order to experience the complete suspense and enjoyment of the game to the same extent that would be possible by directly opening the windows 18 of the lottery ticket 12. However, since some players may periodically wish to quickly observe the play symbols 24 under all of the windows 18, the front panel 44 alternatively includes a combined switch 68 which can be activated to cause the electronic control means to generate a display signal for each of the display areas 64 to reveal all of the play symbols 24 aligned with the windows 18 of the ticket 12 dispensed from the machine 40.

The display screen 62 also includes a game information display area 70 and a winner display area 72 in order to provide additional features of the invention which can be conveniently used to play the game. As best seen in FIG. 5, the game information display area 70 is similar to the back surface 33 of the rear sheet 16 of the lottery ticket 12. In other words, all of the information available to a player regarding possible wins, the amount of winnings and the likelihood of obtaining such winning tickets 12 is included in the game information display area 70. The area 70 including the game information is generated by the electronic control means (FIG. 6) within the housing and would be changed to reflect a different game if different lottery tickets 12 were to be supplied to the ticket storage means of the machine 40. The game information of the preferred machine 40 is not included in the ticket information of the bar code markings 38 but is included in the memory of the electronic control means so that it may be continuously displayed in the area 70 before any tickets 12 are dispensed from the machine 40 and until all of the tickets 12 are dispensed and a different ticket is to be provided thereby.

With the game information display area 70 and with the display areas 64 which could include all of the play symbols 24 under the various windows 18 of the ticket 12 which has been dispensed from the machine, a player should be able to determine if there are any winning symbols 26 without having to physically open any of the windows 18. However, the preferred display screen 62 of the machine 40 also includes the winning display area 72 to provide a positive indication of a winning ticket 12 in the event that a player does not recognize the winning symbols 26 or is not sure what the winning amount of the winning ticket 12 might be. Accordingly, The preferred bar code markings 38 of each lottery ticket 12 includes winning information in the ticket information. When the bar code reading device 60 reads the markings 38 on the lottery ticket 12 being dispensed from the ticket storage means, the electronic control means stores the winning information. As seen in FIG. 4, the winning display area 72 includes no winning information because neither of the play symbols 24 in the first two display area 64 are winning symbols 26. Although the ticket 12 having been dispensed form the machine 40 of FIG. 4 includes winning information (because of the winning symbol 26 in the fourth window 18), the winning signal is not generated for use in the winning display area 72 until after the fourth switch 66 (or the combined switch 68) has been activated. To do otherwise would allow winning information to be provided to the player before desired and would ruin the suspense of the game. Although a winning signal could, in one embodiment of the invention, be generated immediately after the switch associated with a display area 64 having a winning symbols 26, in the preferred machine 40, the existing winning signal or signals will be generated by the electronic control means only after all of the switches 66 have been activated or the combined switch 68 has been activated to provide some indication in the winning display area 72 of the existence of a winning ticket 12. By delaying the winning signal in this manner, full suspense is maintained during the play of the game and the player will not prematurely assume that there is only one winning symbol 26 when there might be two or more.

As seen in FIG. 5, the display screen 62 includes all of the display signals having been provided to the display areas 64 to reveal that the first, second, third and fifth windows 18 included play symbols 24 which are not winning symbols 26. The fourth display area 62 shows that the corresponding window 18 includes a winning symbol 26. The preferred display area 62 with the winning symbol 26 includes a line 80 as a visible indication of the winning status. As will be seen, the line 80 is a desirable cumulative indication of a winning ticket 12 but may not be necessary in view of the preferred winning display area 72. The winning display area 72 includes repeated indication of a "WIN" and an arrow 82 including the amount 84 of the win, which is "$.50" for the particular ticket 12 shown in the Figures. The preferred arrow 82 is located relative the game information display area 70 and points to the particular winning symbol thereof which is like the winning symbol 26 of the fifth window 18. With the arrow 82 (or arrows 82), the player can quickly see which winning symbol (or winning symbols) are on the ticket 12 and quickly verify the amount 84 to be paid for the winning ticket 12. The preferred game information display area 70 is provided as a portion of the display screen 62 to provide the desired relationship with respect to the winning display area 72. However, it would be possible to provide an alternative game information display area outside of the area of the display screen. The alternative game information display area could be located on a portion of the front panel of the machine in alignment with a side of the display screen and an alternative winning display area thereof.

As seen in FIG. 6, a diagram primarily demonstrates the significance of the electronic control means as it relates to the other preferred components of the lottery ticket dispensing system including various features of the invention. The electronic control circuitry, including the program to process, store and utilize information from other components and to initiate various signals and commands to other components is the central component of the preferred machine 40. The diagram of FIG. 6 is a simplified indication of the existence of the most significant operational connections between the various components of the preferred ticket lottery dispensing system as discussed in detail hereinabove. It should be noted that other connections between the components which are well-known in the vending machine art may not have been discussed hereinabove as being outside the scope of the invention as claimed. For example, as explained, the electronic control circuitry is operably connected to the racks of the ticket storage means but there has heretofore been no discussion of other electronic information that is routinely transmitted between the racks and the electronic control circuitry. Numerous sensors in the racks are employed to determine which rack is to be next used, that there are tickets therein, and/or that one or more of the racks no longer includes any tickets therein. Similarly, there are various continuous signals from the currency receiving and identifying means and from the bar code reading device to the electronic control circuitry to monitor their operation and their ability to properly function to provide the more significant features which were discussed above as they relate to the overall operation of the preferred lottery ticket dispensing system. Accordingly, the various connecting lines between the components not only provide the primary functions discussed above but additional routine functions that are well-known in the vending machine art and outside the scope of the invention as claimed.

It should be clear that the description provided hereinabove is directed to a preferred embodiment but that numerous alterations could be made to the lottery ticket dispensing machine without departing from the scope of the invention as claimed. The particular ticket 12 is shown for demonstration purposes only and one skilled in the art would recognize that an unlimited variety and form could be employed to alter the number of windows, the type of play symbols, the number and type of winning symbols, and the amount to be paid for various winning tickets for other lottery tickets that could be provided to practice the invention.

In fact, with the preferred ticket information including the winning information, the preferred electronic control means is able to process and store the winning information for use in the winning display area. However, having the description of the preferred embodiments as taught herein, it would be possible for one skilled in the electronic control art to include a bar code marking which have ticket information which does not directly include winning information. An alternative electronic control means could be configured to process specific ticket information that clearly includes the location and character of each of the play symbols for each ticket. The program of the alternative electronic control means could being configured to compare the specific ticket information to all of the possible winning symbol configurations stored therein. Consequently, the alternative electronic control means itself would determine if there were play symbols that are winning symbols and then create the appropriate winning signals to be provided to a winning display area for a similar indication of a winning ticket having been dispensed from the ticket dispensing machine. Any number of other alternatives to the preferred embodiments could be made by those skilled in the art without departing from the scope of the invention as claimed.

What is claimed is:

1. A lottery ticket dispensing system for lottery tickets of the type which include a front sheet having a plurality of windows which are normally closed, a rear sheet, means for bonding the front sheet and the rear sheet together, a plurality of play symbols on one side of the rear sheet toward the front sheet, at least some of the play symbols capable of being winning symbols, each of the play symbols being respectively aligned with one of the windows, and each of the plurality of windows for being selectively opened to reveal the play symbol thereunder, said lottery ticket dispensing system comprising:

bar code markings on each of the lottery tickets including ticket information for indicating each of the play symbols as aligned with its respective window;

a lottery ticket dispensing machine including a housing and a front panel;

ticket storage means in said housing for storing an plurality of the lottery tickets;

ticket dispensing initiation means in said housing;

electronic control means in said housing for responding to activation of said ticket dispensing initiation means and for dispensing a lottery ticket from said ticket storage means to said front panel;

a bar code reading device in said housing operably connected to said electronic control means for reading and identifying said bar code markings of each lottery ticket and for storing said ticket information in said electronic control means regarding each of the play symbols as aligned with its respective window as the lottery ticket is being dispensed from said ticket storage means;

said front panel including a plurality of display areas which directly correspond to the plurality of windows of the lottery ticket;

each of said display areas being operably connected to said electronic control means for receiving display signals therefrom;

said front panel having switch means associated with said each of said display areas;

each of said switch means being operably connected to said electronic control means;

said switch means for being selectively actuated to provide an actuation signal to said electronic control means to cause said electronic control means to generate said display signal for said display area associated with said switch means;

said display signal producing a display symbol in said display area; and, for each lottery ticket having been dispensed from said ticket storage means, said display symbol in said each display area being directly indicative of the play symbol aligned with the window which corresponds to said display area associated with said each switch means which has been selectively actuated.

2. The lottery ticket dispensing system according to claim 1, wherein said ticket dispensing initiation means includes currency receiving means in said housing for receiving currency of a predetermined amount and said electronic control means is for determining when said amount is received within said currency receiving means and for dispensing the lottery ticket.

3. The lottery ticket dispensing system according to claim 1, wherein said bar code markings include winning information for indicating when the play symbols are winning symbols, said front panel includes a winning display area, said electronic control means identifies and stores said winning information, said electronic control means generates a winning signal when said winning information is in said ticket information, said winning display area is operably connected to said electronic control means for receiving said winning signal therefrom, and said winning signal produces a winning indication in said winning display area after said switch means associated with said window having said play symbols which are winning symbols is actuated.

4. The lottery ticket dispensing system according to claim 3, wherein said winning signal produces said winning indication in said winning display area after all of said switch means associated with said windows have been actuated.

5. The lottery ticket dispensing system according to claim 3, wherein said front panel includes game information indicating a plurality of possible winning symbols associated with the lottery tickets in said ticket storage means and said winning indication in said winning display area is displayed relative to a corresponding said winning symbol in said game information on said front panel.

6. The lottery ticket dispensing system according to claim 3, wherein said front panel includes a combined switch means, said combined switch means is operably connected to said electronic control means, said combined switch means is capable of being actuated to generate said display signals for all of said display areas of said each lottery ticket having been dispensed from said ticket storage means to produce said display symbols in all of said display areas and to produce any said winning indication in said winning display area.

7. The lottery ticket dispensing system according to claim 1, wherein said ticket storage means includes a discharge chute for passage of the lottery ticket from an interior of said housing to an exterior of said housing at said front panel, said discharge chute includes ticket retarding means for retarding said passage of the lottery ticket to said exterior of said housing, and said bar code reading device is aligned with said discharge chute and any lottery ticket therein which is being retarded by said ticket retarding means.

8. The lottery ticket dispensing system according to claim 7, wherein said bar code reading device is capable of reading said bar code markings when the lottery ticket is maintained in a fixed position in said discharge chute by said ticket retarding means.

9. The lottery ticket dispensing system according to claim 7, wherein said ticket retarding means includes a normally closed gate, said normally closed gate is electronically controlled by said electronic control means, said electronic control means is capable of repeatedly activating said bar code reading device until said bar code reading device has properly identified said bar code markings and said electronic control means causes said normally closed gate to be opened to release the lottery ticket for continued passage to said exterior of said housing at said front panel after said ticket information is stored within said electronic control means.

10. The lottery ticket dispensing system according to claim 9, wherein said ticket storage means includes a plurality of ticket storage racks and each of said plurality of said ticket storage racks is aligned with said discharge chute for selectively discharging the lottery tickets therein to said discharge chute.

11. A lottery ticket dispensing system for lottery tickets of the type which include a front sheet having window means which are normally closed, a rear sheet, means for bonding the front sheet and the rear sheet together, a plurality of play symbols on one side of the rear sheet toward the front sheet, at least some of the play symbols capable of being winning symbols, the play symbols being respectively located in various regions of the one side aligned with the window means, and the window means for being selectively opened to reveal the play symbols in the various regions thereunder, said lottery ticket dispensing system comprising:

bar code markings on each lottery ticket including ticket information for indicating each of the play symbols in the various regions;

a lottery ticket dispensing machine including a housing and a front panel;

ticket storage means in said housing for storing an plurality of the lottery tickets;

ticket dispensing initiation means in said housing;

electronic control means in said housing for responding to activation of said ticket dispensing initiation means and for dispensing a lottery ticket from said ticket storage means to said front panel;

a bar code reading device in said housing operably connected to said electronic control means for reading and identifying the bar code markings of each lottery ticket and for storing the ticket information in said electronic control means regarding each of the play symbols as located in the various regions as the ticket is being dispensed from said ticket storage means;

a front panel having a plurality of display areas which directly correspond to the various regions of the lottery ticket;

each of said display areas being operably connected to said electronic control means for receiving display signals therefrom;

said front panel having switch means associated with said each of said display areas;

each of said switch means being operably connected to said electronic control means;

said switch means for being selectively actuated to provide an actuation signal to said electronic control means to cause said electronic control means to generate said display signal for said display area associated with said switch means;

said display signal producing a display symbol in said display area; and, for each lottery ticket having been dispensed from said ticket storage means, said display symbol in said each display area being directly indicative of the play symbols of each of the various regions which corresponds to said display area associated with said each switch means which has been selectively actuated.

12. The lottery ticket dispensing system according to claim 11, wherein said bar code markings includes winning information for indicating when the play symbols are winning symbols, said front panel includes a winning display area, said electronic control means identifies and stores said winning information, said electronic control means generates a winning signal when said winning information is in said ticket information, said winning display area is operably connected to said electronic control means for receiving said winning signal therefrom, and said winning signal produces a winning indication in said winning display area after said switch means associated with one of said various regions having said play symbols which are winning symbols is actuated.

13. The lottery ticket dispensing system according to claim 12, wherein said front panel includes game information indicating a plurality of possible winning symbols associated with the lottery tickets in said ticket storage means and said winning indication in said winning display area is displayed relative to a corresponding said winning symbol in said game information on said front panel.

14. The lottery ticket dispensing system according to claim 12, wherein said front panel includes a combined switch means, said combined switch means is operably connected to said electronic control means, said combined switch means is capable of being actuated to generate said display signals for all of said display areas of said each lottery ticket having been dispensed from said ticket storage means to produce said display symbols in all of said display areas and to produce any said winning indication in said winning display area.

15. A lottery ticket dispensing machine for dispensing lottery tickets of the type which include a base sheet having a plurality of play symbols respectively disposed within a plurality of regions on one side of the base sheet, at least some of the play symbols capable of being winning symbols, and bar code markings on each lottery ticket including ticket information for indicating each of the play symbols as arranged in the plurality of regions on the one side of the base sheet, said lottery ticket dispensing machine comprising:

ticket storage means for storing an plurality of the lottery tickets;

ticket dispensing initiation means in said housing;

electronic control means in said housing for responding to activation of said ticket dispensing initiation means and for dispensing a lottery ticket from said ticket storage means to said front panel;

a bar code reading device operably connected to said electronic control means for reading and identifying the bar code markings of each lottery ticket and for storing the ticket information in said electronic control means regarding each of the play symbols as arranged in the plurality of regions on the one side of the base sheet as the lottery ticket is being dispensed from said ticket storage means;

a front panel having a plurality of display areas which directly correspond to the plurality of regions having the play symbols;

each of said display areas being operably connected to said electronic control means for receiving display signals therefrom;

said front panel having switch means associated with said each of said display areas;

each of said switch means being operably connected to said electronic control means;

said switch means for being selectively actuated to provide an actuation signal to said electronic control means to cause said electronic control means to generate said display signal for said display area associated with said switch means;

said display signal producing a display symbol in said display area; and, for each lottery ticket having been dispensed from said ticket storage means, said display symbol in said each display area being directly indicative of the play symbols of each region which corresponds to said display area associated with said each switch means which has been selectively actuated.

16. The lottery ticket dispensing machine according to claim 15, wherein said electronic control means is capable of analyzing said ticket information and of determining if the play symbols in a particular region are winning symbols, said front panel includes a winning display area, and said electronic control means generates a winning signal when the particular region has the winning symbols, said winning display area is operably connected to said electronic control means for receiving said winning signal therefrom, and said winning signal produces a winning indication in said winning display area after said switch means associated with said display area corresponding with the particular region is actuated.

17. The lottery ticket dispensing machine according to claim 16, wherein said front panel includes game information indicating a plurality of possible winning symbols associated with the lottery tickets in said ticket storage means and said winning indication in said winning display area is displayed relative to a corresponding said winning symbol in said game information on said front panel.

18. A method of dispensing lottery tickets of the type which include a base sheet having a plurality of play symbols respectively disposed within a plurality of regions on one side of the base sheet, and at least some of the play symbols capable of being winning symbols, said method comprising the steps of:

providing bar code markings on each lottery ticket which include ticket information for indicating each of the play symbols as arranged in the plurality of regions on the one side of the base sheet;

providing a machine having a housing and a front panel;

storing a plurality of the lottery tickets in said housing;

providing ticket dispensing initiation means in said housing;

determining when said ticket dispensing initiation means is actuated and dispensing a lottery ticket from said housing to said front panel;

reading said bar code markings to identify said ticket information and storing said ticket information regarding each of the play symbols as arranged in said plurality of regions on the one side of the base sheet as the lottery ticket is dispensed from said housing;

providing a plurality of display areas on said front panel which directly correspond to the plurality of regions having play symbols;

providing switch means on said front panel for each of said display areas; and separately actuating each of said switch means respectively associated with each of said regions and displaying a display symbol in said display area which is directly indicative of the play symbol of each of said regions on the one side of the base sheet of the lottery ticket that has been dispensed from said housing.

19. The method of dispensing lottery tickets according to claim 18, wherein said providing said bar code markings on said each lottery ticket to further include winning information for indicating when the play symbols are winning symbols, said reading said bar code markings to identify and store said winning information as the lottery ticket is dispensed from said housing and further including the steps of providing a winning display area on said front panel and displaying a winning indication in said winning display area after said actuating of said switch means associated with said region having play symbols which are winning symbols.

20. The method of dispensing lottery tickets according to claim 18, wherein said dispensing the lottery ticket includes discharging the lottery ticket from an interior of said housing to an exterior of said housing at said front panel, further including the steps of retarding the passage of said lottery ticket in said discharge chute during said reading of said bar code markings and releasing the lottery ticket for continued passage to said front panel after said storing of said ticket information.

21. The method of dispensing lottery tickets according to claim 18, further including the step of providing currency receiving means in said housing for receiving currency of a predetermined amount and for activating said ticket dispensing initiation means when said currency of said predetermined amount has been received therein.

* * * * *